US006973236B2

(12) United States Patent
So et al.

(10) Patent No.: US 6,973,236 B2
(45) Date of Patent: Dec. 6, 2005

(54) VERTICAL TAPER WAVEGUIDE

(75) Inventors: Daniel W. So, Palo Alto, CA (US); Chan H. Yoo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/328,478

(22) Filed: Dec. 24, 2002

(65) Prior Publication Data
US 2004/0120674 A1 Jun. 24, 2004

(51) Int. Cl.$^7$ ............................. G02B 6/34; G02B 6/00
(52) U.S. Cl. .............................. 385/37; 385/43; 385/45
(58) Field of Search ............................. 385/37, 43, 45

(56) References Cited

U.S. PATENT DOCUMENTS

| | | | | |
|---|---|---|---|---|
| 6,049,644 A | * | 4/2000 | Dragone | 385/37 |
| 6,069,990 A | * | 5/2000 | Okawa et al. | 385/43 |
| 6,304,706 B1 | * | 10/2001 | Sugita et al. | 385/129 |
| 6,587,604 B2 | * | 7/2003 | Yamauchi | 385/3 |
| 2002/0146205 A1 | * | 10/2002 | Shimoda | 385/43 |
| 2003/0012497 A1 | * | 1/2003 | McGreer et al. | 385/37 |
| 2003/0032285 A1 | * | 2/2003 | Beguin et al. | 438/689 |
| 2003/0174956 A1 | * | 9/2003 | Viens | 385/43 |
| 2003/0194181 A1 | * | 10/2003 | Dragone | 385/37 |
| 2003/0223719 A1 | * | 12/2003 | Salib | 385/129 |
| 2004/0114869 A1 | * | 6/2004 | Fike et al | 385/43 |

FOREIGN PATENT DOCUMENTS

| | | | | |
|---|---|---|---|---|
| EP | 0 881 512 A2 | | 12/1998 | |
| EP | 0 984 304 A2 | | 3/2000 | |
| GB | 2 227 854 A | | 8/1990 | |
| JP | 09061652 A | * | 3/1997 | ............ G02B 6/13 |
| JP | 2000147283 | | 5/2000 | |
| JP | 2000206352 A | * | 7/2000 | ............ G02B 6/122 |

OTHER PUBLICATIONS

Sugita et al., "Very Low Insertion Loss Arrayed-Waveguide Grating with Vertically Tapered Waveguides", IEEE Photonics Technology Letters, vol. 12, No. 9, Sep. 2000, pp. 1180-1182.*

T. Brenner et al., "Vertically Tapered InGaAsP/InP Waveguides for Highly Efficient Coupling to Flat-End Single-Mode Fibers," Applied Physics Letters, American Institute of Physics, vol. 65, No. 7, Aug. 15, 1994, pp. 798-800, XP-000464547, New York, USA.

Ingrid Moerman et al., "A Review on Fabrication Technologies for the Monolithic Integration of Tapers with III-V Semiconductor Devices," IEEE Journal of Selected Topics in Quantum Electronics, vol. 3, No. 6, Dec. 1997, pp. 1308-1320, XP-002146284, USA.

A. Sugita et al., "Very Low Insertion Loss Arrayed-Waveguide Grating with Vertically Tapered Waveguides," IEEE Photonics Technology Letters, vol. 12, No. 9, Sep. 2000, pp. 1180-1182, XP-000968634, USA.

* cited by examiner

Primary Examiner—Michelle R. Connelly-Cushwa
(74) Attorney, Agent, or Firm—Kevin A. Reif

(57) ABSTRACT

A tapered waveguide improves insertion loss occurring at the slab/waveguide interface of an optical array waveguide grating (AWG). The tapered waveguide has two segments. The first segment decreases from a first thickness, nearest the slab of the AWG to a second thickness moving away from the slab. The second segment has a substantially constant or uniform thickness equal to the second thickness of the first segment. The second segment may also have a swallowtail shape comprising a forked end having two sidewalls tapered back towards the first segment. Light that would otherwise be lost at the slab/waveguide interface is instead captured by the tapered waveguide which laterally channels the light back into the waveguides thus mitigating insertion loss.

15 Claims, 4 Drawing Sheets

VERTICAL TAPER WAVEGUIDE

FIELD OF THE INVENTION

An embodiment of the present invention is related to optical planar lightwave circuits and, more particularly, to a vertically tapered waveguide such as those between the waveguides at the slab-waveguide interface of an Arrayed Waveguide Grating (AWG) to mitigate insertion losses.

BACKGROUND INFORMATION

Wavelength division multiplexing (WDM) has transformed the single fiber into a high capacity information conduit. Among the many devices that make this transformation to happen, the Arrayed Waveguide Grating (AWG) has been one of the key components. AWGs are extremely versatile devices that are capable of multiplexing or demultiplexing many different frequency channels simultaneously carried on a single fiber. When integrated with other planar lightwave devices, AWG may perform many essential functions, such as optical crossconnect and optical add/drop multiplexing. There is a continuous push to improve the performance of AWGs. AWG insertion loss is one of the key performance factors that determine the power budget in the system.

FIG. 1 illustrates an example of how a basic AWG may operate to demultiplex a plurality of channels. In short, an AWG may comprise input/output waveguides, two slab regions and a phase array of planar waveguides which may have a constant path length difference with the neighboring waveguides. In this example, an input waveguide 100 simultaneously carries four multiplexed channels. Of course in practice, many times this number of channels are possible. Each channel is represented by a different wavelength or color of light denoted as $\lambda 1$, $\lambda 2$, $\lambda 3$, and $\lambda 4$. The light from the input waveguide 100 enters the first slab region 102. The input waveguide 100 is coupled at a first end 104 of the slab 102. The array of waveguides 106 fan out from the opposite side of the slab 102.

Light input to the slab region 102 from the input waveguide 100 enters as a guided mode with confined mode dimension. Ideally, the input waveguide—slab interface is designed to convert this guided mode in such a way that the wavefront will appear as a plane wave and conforms to the curvature of the output end of the slab 102. The output waveguides 106 capture the resultant light wave and carry it to a second slab region 108. Light carried in each output waveguides 106 is input to a second slab region 108. Each input carries a light signal containing components of $\lambda 1$, $\lambda 2$, $\lambda 3$, and $\lambda 4$, and again enters the second slab region 108 as guided mode. In the second slab region 108 these signals are diffracted and constructively and destructively interfere with one another such that the resultant signal carried in each of the output waveguides 112 of the second slab region 108 comprises only a single channel or wavelength. This arrangement works similarly in the reverse direction to multiplex a plurality of channels onto a single waveguide.

Insertion loss typically occurs when a light signal travels or is inserted from one medium or waveguide to the next. At any transition point, some loss usually occurs. For example, reflection due to the difference in the index of refraction in the guiding media, scattering due to imperfection in the waveguide structure, diffraction due to abrupt change in the physical dimensions of the guiding media may contribute to loss. In the case of an AWG, one of the major contributions in the insertion loss occurs at the interface between the slab and the waveguides transition. For example, still referring to FIG. 1, the portion of the light signal that impinges the area between the waveguides 114 tends to be lost and contributes the overall insertion loss for the system.

Improvements to AWGs have been made to mitigate insertion losses. For example, as shown in FIG. 2A, a portion of the AWG comprises a slab 200 and a plurality of waveguides 202–210. In addition, a vertically tapered waveguide 220 is formed between each waveguides 202–210 at the slab-waveguide interface. The vertically tapered waveguide 220 essentially comprises a wedge shaped portion having a vertical height matching the height of the slab 220 at the point 222 nearest the slab 200 which linearly decrease to a near zero height at its termination point 224 furthest from the slab 220. In theory, light that would otherwise be lost between the fingers 202–210 instead enters the vertically tapered waveguide 220 whereupon at least a portion of the light is redirected laterally back into the waveguides 202–210 thus reducing insertion loss.

The shape of the waveguide 220 is also illustrated in FIG. 2B which shows a vertical profile of the tapered waveguide 220 running alongside waveguide 210. At its first end 222 nearest the slab 200, the tapered waveguide 220 has a height approximately the same as the height of the slab 200. The height of the waveguide linearly decreases to its terminal end 224 where, ideally, the height or thickness of the tapered waveguide 220 approaches a zero thickness. However, this is impossible given practical manufacturing constraints. Thus, as shown in FIG. 2B, when the thickness of the waveguide decreases to a height at or below current manufacturing capabilities, an uneven or jagged profile 226 results. These imperfections 226 cause scattering and contribute to insertion loss.

DETAILED DESCRIPTION

One of the embodiments of the invention comprises a vertically tapered waveguide such as to be used between the waveguides of an Arrayed Waveguide Grating (AWG). The waveguide does not require any special manufacturing tools or equipment and may be fabricated using traditional methods such as photoresist and reactive ion etching (RIE) techniques, for example.

It is well known that as a photoresist film thins down, the film often breaks down beyond a certain minimum thickness. For example, the breakup thickness for a particular photoresist may be around 0.3 $\mu$m. Below this minimum thickness, the photoresist in some cases is no longer a single, homogenous film with uniform thickness. Any breakage in the film may be transferred during fabrication and cause additional roughness on the etched surfaces such as that shown by 226 of FIG. 2B.

Figure 3:
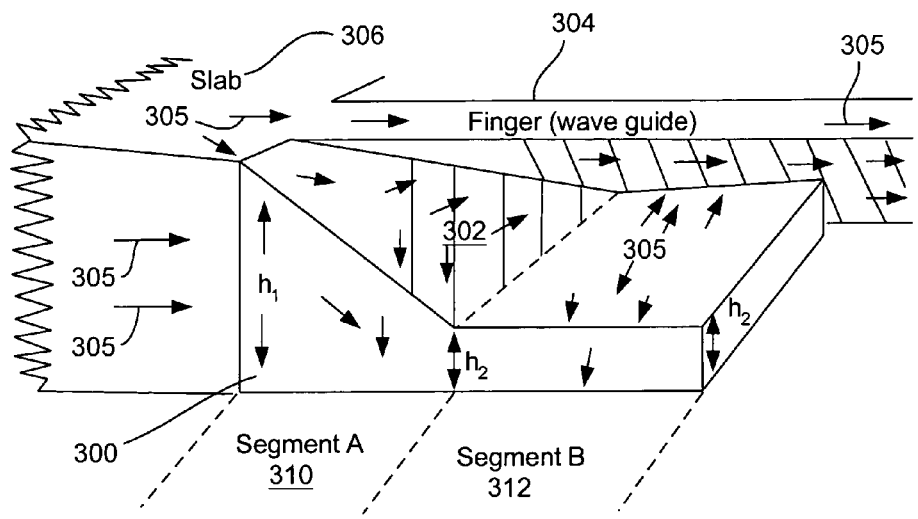
FIG. 3 is a plan view of a vertically tapered waveguide according to one embodiment of the invention.

According to an embodiment, to avoid the creation of a rough etched surface, the photoresist needs to maintain a minimum thickness. Referring now to FIG. 3 there is shown a vertically tapered waveguide 300 according to one embodiment of the invention. As shown, the waveguide 300 has a horizontal profile 302 shaped to fit between the waveguides 304 and the slab 306 of an Arrayed Waveguide Grating (AWG). The vertical taper however, comprises two segments, denoted as Segment A 310, and Segment B 312. Segment A 310 has a vertical profile having a vertical taper that gradually or smoothly decreases from a first thickness or height h1, approximately equal to the height of the slab 306 to a second height h2. The second height h2 can be made as thin as current manufacturing technology can reliably resolve. For example, for a germanium doped silica planar lightwave circuit, a typical height for h1 and h2 may be around 6.0 $\mu$m and 2.0 $\mu$m, respectively.

Segment B 312 has a substantially constant height equal to h2. Light, illustrated by the plurality of arrows 305, that enter the waveguide 300 tends to be channeled laterally into the adjacent fingers 304. This arrangement of leveling off the second segment 312 to a substantially constant height or thickness may avoid the terminal end imperfections (226 of FIG. 2B) and may improve insertion loss. Segment B 312, provides a smooth, gradual transition reducing scattering loss and thus further reducing insertion loss. Further, this design may reduce the aspect ratio for subsequent upper cladding disposition thus may reduce any gap fill problems.

Figure 4:
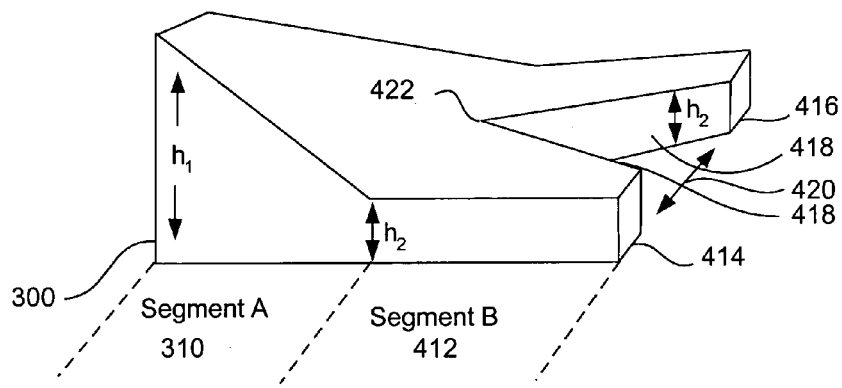
FIG. 4 is a plan view of a vertically tapered waveguide according to another embodiment of the invention.

FIG. 4 shows yet another embodiment of the present invention similar to that shown in FIG. 3. As before, Segment A 310, has a vertical taper wherein the thickness linearly decreases as the distance increases away from the slab 306 interface. In addition, Segment B 412, while still maintaining a substantially constant thickness h2, is forked and includes laterally tapered sidewalls 418 resulting in a swallowtail shape. As shown, the forked Segment B 412 may have two prongs 414 and 416. Each prong 414 and 416 has an inner sidewall 418 that is angled back into Segment B 412 to a triangular apex 422. This results in a wedged shaped cut out 420 formed along a central axis. Both prongs 414 and 416 have a substantially uniform or constant thickness equal to h2. This swallowtail shape may act to channel even more light entering the waveguide 300 laterally into the adjacent waveguides (304 of FIG. 3) thus further reducing insertion loss.

Figure 1:
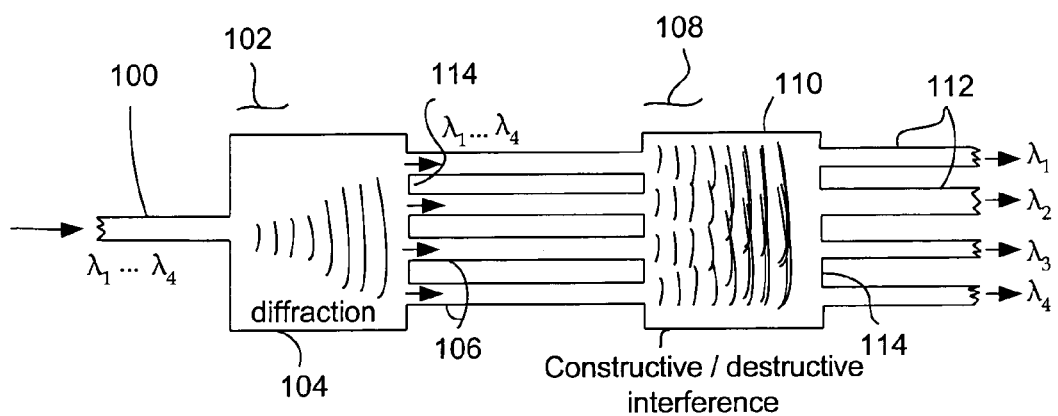
FIG. 1 is a diagram illustrating multiplexing/demultiplexing operation of Arrayed Waveguide Gratings (AWGs)
Figure 2A:
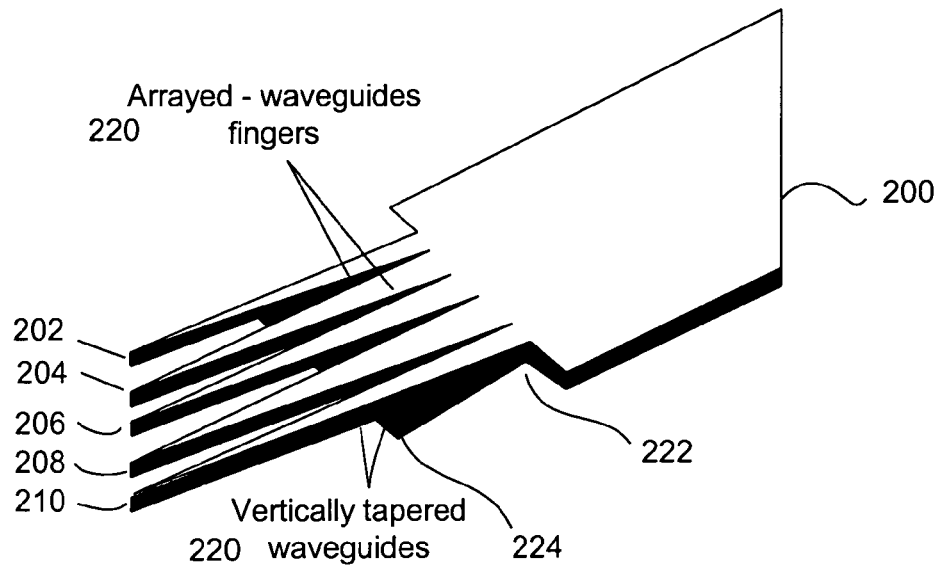
FIG. 2A is a diagram illustrating an AWG including vertically tapered waveguides between the fingers to mitigate insertion loss.
Figure 2B:
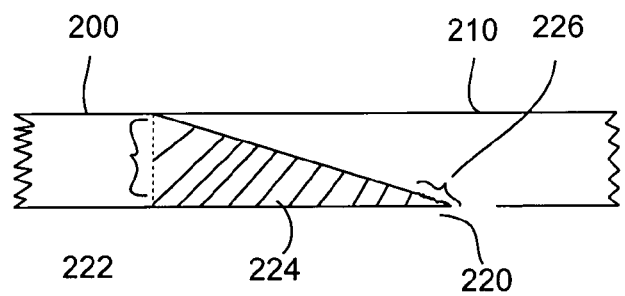
FIG. 2B is a side profile view of the of the AWG shown in FIG. 2A.

As an example of the inner sidewall angle 418, for the germanium doped silica waveguide, as shown in the prior art, FIG. 2A, the vertical taper waveguide is about 180 $\mu$m in length. If this is used as a guideline, the length for Segment 310 in FIG. 4 may be about 120 $\mu$m since the minimum thickness for Segment 412 is about 2 $\mu$m. Assuming that the waveguides are separated by 30 $\mu$m and the minimum width at the tips of the two prongs, 414 and 416, are 2 $\mu$m. For this hypothetical example, the angle for the sidewall 418 may be about 250.

Figure 5:
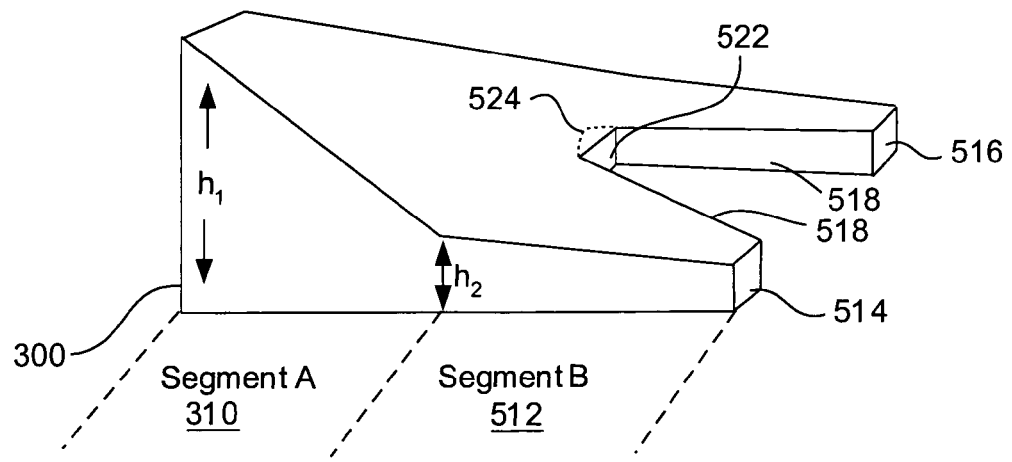
FIG. 5 is a plan view of a vertically tapered waveguide according to yet another embodiment of the invention.

FIG. 5 shows additional embodiments of the invention. As in FIG. 4, Segment B 512 is forked having a swallowtail shape. As shown, the forked Segment B 512 has two prongs 514 and 516. Each prong 514 and 516 has an inner sidewall 518 that is angled back into Segment B 412. However, unlike the embodiment shown in FIG. 4, the sidewalls 518 do not meet at a triangular apex, but rather each terminate at a flat vertical surface forming a flat apex 522. Optionally, the point at which the sidewalls meet may form a rounded or may have a circular apex as illustrated by dashed line 524. Both of these variations may simplify manufacture since these shapes require less precision than the triangular apex 422 shown in FIG. 4.

In FIGS. 3–5, the change in thickness of Segment A, and the change in width of Segment B from h1 to h2 is shown as linear, however, the change could also be exponential, parabolic, or any other such function.

While embodiments of the invention have been described for use with AWGs, the disclosed waveguides can also be incorporated into many other optical devices. Indeed, any planar lightwave components with a Y-branch structure will benefit from using this tapered design. For example, the vertical tapered waveguides can be employed to reduce the insertion loss of a Y-branch splitter.

In addition, the disclosed waveguides can be manufactured from a variety of materials. Examples include silicon-on-insulator, silica, silicon oxynitride, indium phosphide, or any other compound semiconducting materials from Group III–V and II–VI.

What is claimed is:

1. An optical waveguide, comprising:
   a first segment having a first thickness at a first end that decreases to a second thickness at a second end; and
   a second segment, integral with said first segment, having a substantially constant thickness equal to said second thickness, said second segment further comprises:
   a swallowtail shape having a generally wedged shaped notch formed along a central axis, wherein said wedge shaped notch comprises tapered sidewalls.

2. A swallowtail optical waveguide to fit between the branches of a Y-splitter to reduce insertion loss, comprising:
   a first segment having a first thickness at a first end that decreases to a second thickness at a second end; and
   a second segment, integral with said first segment, having a substantially constant thickness equal to said second thickness, said second segment comprising:
   a forked portion having sidewalls tapered back towards said first segment.

3. The swallowtail optical waveguide as recited in claim 2, wherein an apex of said forked portion is one of triangular, rounded, and flat in shape.

4. The swallowtail optical waveguide as recited in claim 2 wherein said first thickness of said first segment decreases as one of linearly, parabolically and exponentially to said second thickness.

5. The swallowtail optical waveguide as recited in claim 2 wherein said sidewalls of said second segment comprises one of a linear, parabolic, and exponential taper.

6. The swallowtail optical waveguide as recited in claim 2 wherein said first and said second segments comprise one of silicon-on-insulator, silica, silicon oxynitride, indium phosphide, and any other compound semiconducting materials from Group III–V and II–VI.

7. A method for reducing insertion loss between fingers of an optical waveguide, comprising:
   providing a first segment against a slab between fingers of a waveguide having a thickness nearest said slab approximately equal to the height of said slab that decreases from a first thickness to a second thickness;
   providing a second segment between the fingers of the waveguide integral with said first segment, said second segment having a substantially constant thickness equal to said second thickness.

8. The method for reducing insertion loss as recited in claim 7 further comprising:

providing a notch in said second segment along a central axis comprising tapered sidewalls tapered back toward said first segment.

9. The method for reducing insertion loss as recited in claim 7, further comprising:
decreasing said first thickness of said first segment one of linearly, parabolically and exponentially to said second thickness.

10. The method for reducing insertion loss as recited in claim 9 further comprising:
tapering said sidewalls of said notch one of linearly, parabolically and exponentially back toward said first segment.

11. The method for reducing insertion loss as recited in claim 9 further comprising:
shaping an apex of said notch as one of triangular, rounded, and flat.

12. The method for reducing insertion loss as recited in claim 7 further comprising:
forming said first and said second segments from one of silicon-on-insulator, silica, silicon oxynitride, indium phosphide, and any other compound semiconducting materials from Group III–V and II–VI.

13. An optical waveguide, comprising:
a slab;
at least two fingers extending from the slab;
a vertical tapered section to reduce insertion loss between the fingers, the vertical tapered section comprising:
a first segment having a first thickness at a first end that decreases to a second thickness at a second end; and
a second segment, integral with said first segment, having a substantially constant thickness equal to said second thickness.

14. The optical waveguide as recited in claim 13, wherein said second segment comprises a forked portion having sidewalls tapered back towards said first segment.

15. The optical waveguide as recited in claim 14 wherein an apex of said forked portion is one of triangular, rounded, and flat in shape.

* * * * *